United States Patent
Gevay (12)

(10) Patent No.: US 6,557,801 B1
(45) Date of Patent: May 6, 2003

(54) AIRPLANE EVACUATION SYSTEM AND METHOD THEREFOR

(76) Inventor: Frank M. Gevay, 1000 Caballo Blvd., Henderson, NV (US) 89014

( * ) Notice: Subject to any disclaimer, the term of this patent is extended or adjusted under 35 U.S.C. 154(b) by 0 days.

(21) Appl. No.: 10/143,683

(22) Filed: May 13, 2002

(51) Int. Cl.⁷ ............................................. B64D 25/12
(52) U.S. Cl. ................................... 244/140; 244/118.5
(58) Field of Search .......................... 244/140, 138 R, 244/137.1, 137.2, 118.5

(56) References Cited

U.S. PATENT DOCUMENTS

| | | | | |
|---|---|---|---|---|
| 2,806,666 A | * | 9/1957 | Brown et al. ................. | 225/61 |
| 5,110,071 A | * | 5/1992 | Hunter et al. ............ | 244/137.3 |
| 5,921,504 A | * | 7/1999 | Elizondo .................... | 244/120 |
| 6,382,563 B1 | * | 5/2002 | Chiu ........................ | 244/120 |

FOREIGN PATENT DOCUMENTS

| | | | |
|---|---|---|---|
| FR | 1014875 | * | 6/1952 |
| GB | 201642 | * | 8/1923 |
| GB | 58446 | * | 9/1946 |

* cited by examiner

*Primary Examiner*—J. Woodrow Eldred
(74) *Attorney, Agent, or Firm*—Harry M. Weiss; Weiss, Moy & Harris, P.C.

(57) ABSTRACT

An evacuation system and method for an airplane. The evacuation system and method consists of an evacuation cabin that is positioned within an airplane, and that is deployed through a trap door in the bottom of the airplane. The evacuation cabin is positioned on guide rails that control up and down movement. One or more parachutes located at an upper portion of the evacuation cabin control its velocity when deployed. A flotation device positioned at the bottom of the evacuation cabin may be used in the event of a water landing, or an as impact attenuator.

14 Claims, 3 Drawing Sheets

AIRPLANE EVACUATION SYSTEM AND METHOD THEREFOR

BACKGROUND OF THE INVENTION

Field of Invention

This invention relates generally to airplane safety and emergency systems and methods and, more specifically, to an evacuation system and method comprising an evacuation cabin stowable in a bottom portion of an airplane and deployable through a trap door.

BACKGROUND OF THE INVENTION

The safety of airplane passengers has been a concern from the beginning of aviation. Planes crash for a variety of reasons, including pilot error, mechanical error, weather, etc. Often, it is the case that the pilot is aware that his or her plane is in trouble and is going to crash or is in danger of crashing. However, in many such cases, there is little the pilot can do to ensure his or her safety as well as the safety of the passengers.

A need therefore existed for an evacuation system utilizing an evacuation cabin, mounted in a bottom portion of an airplane, and deployable in the event of an emergency. The cabin should be equipped with one or more parachutes, to permit a landing at a safe velocity. The cabin should be further equipped with an inflatable device, in the event that it is deployed over water. Other emergency-type equipment, including a radio, a beacon, and the like should also be provided, to ensure prompt location of the cabin and the rescue of its occupants. The present invention satisfies these needs and provides other, related advantages.

SUMMARY OF THE INVENTION

It is an object of the present invention to provide an airplane evacuation system and method utilizing an evacuation cabin that is deployable through a bottom portico of an airplane.

It is a further object of the present invention to provide an airplane evacuation system and method utilizing an evacuation cabin that is deployable through a bottom portion of an airplane and that is equipped with a flotation device.

It is a still further object of the present invention to provide an airplane evacuation system and method utilizing an evacuation cabin that is deployable through a bottom portion of an airplane and that is equipped with emergency equipment, including a radio and/or a beacon.

BRIEF DESCRIPTION OF THE PREFERRED EMBODIMENTS

In accordance with one embodiment of the present invention, an evacuation system for an airplane is disclosed. The evacuation system comprises, in combination: an airplane; an evacuation cabin positionable within the airplane; means for detachably coupling the evacuation cabin to the airplane; at least one trap door located at a bottom portion of the airplane and openable to release the evacuation cabin therethrough; at least one passenger seat located in an interior portion of the evacuation cabin; at least one parachute located at an upper portion of the evacuation cabin; and a passageway to permit entrance to the interior portion of the evacuation cabin.

In accordance with another embodiment of the present invention, a method for evacuating passengers from an airplane is disclosed. The method comprises the steps of: providing an airplane; providing an evacuation cabin positionable within the airplane; providing means for detachably coupling the evacuation cabin to the airplane; providing at least one trap door located at a bottom portion of the airplane and openable to release the evacuation cabin therethrough; providing at least one passenger seat located in an interior portion of the evacuation cabin; providing at least one parachute located at an upper portion of the evacuation cabin; providing a passageway to permit entrance to the interior portion of the evacuation cabin; opening the at least one trap door; detachably coupling the evacuation cabin from the airplane; releasing the evacuation cabin through the trap door; and opening the at least one parachute.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
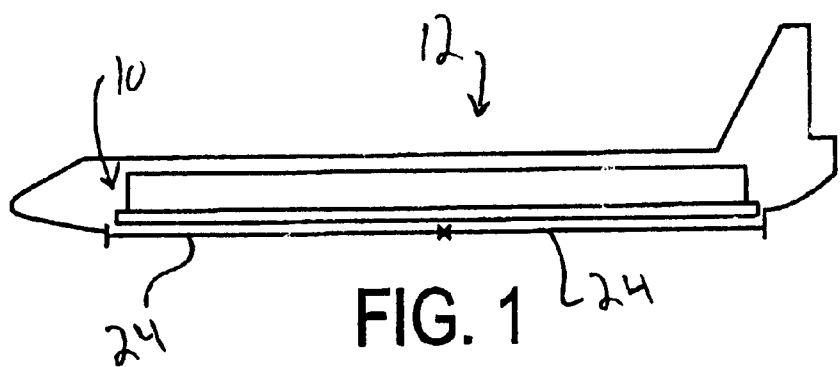
FIG. 1 is a side view of an embodiment of the evacuation cabin of the present invention, positioned within a jet-type airplane.
Figure 2:
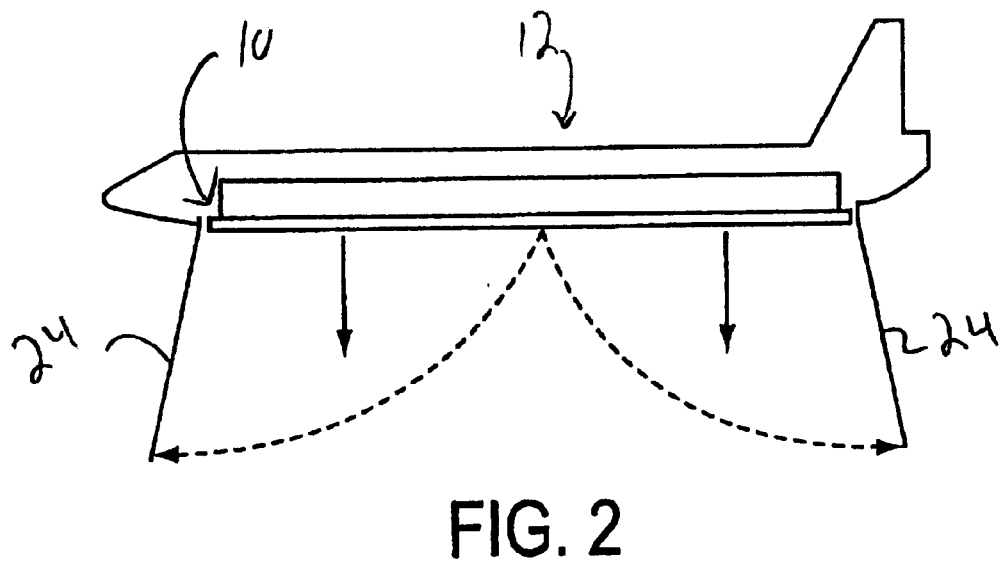
FIG. 2 is a side view of the embodiment of FIG. 1, showing the opening of trap doors to release the evacuation cabin.
Figure 5:
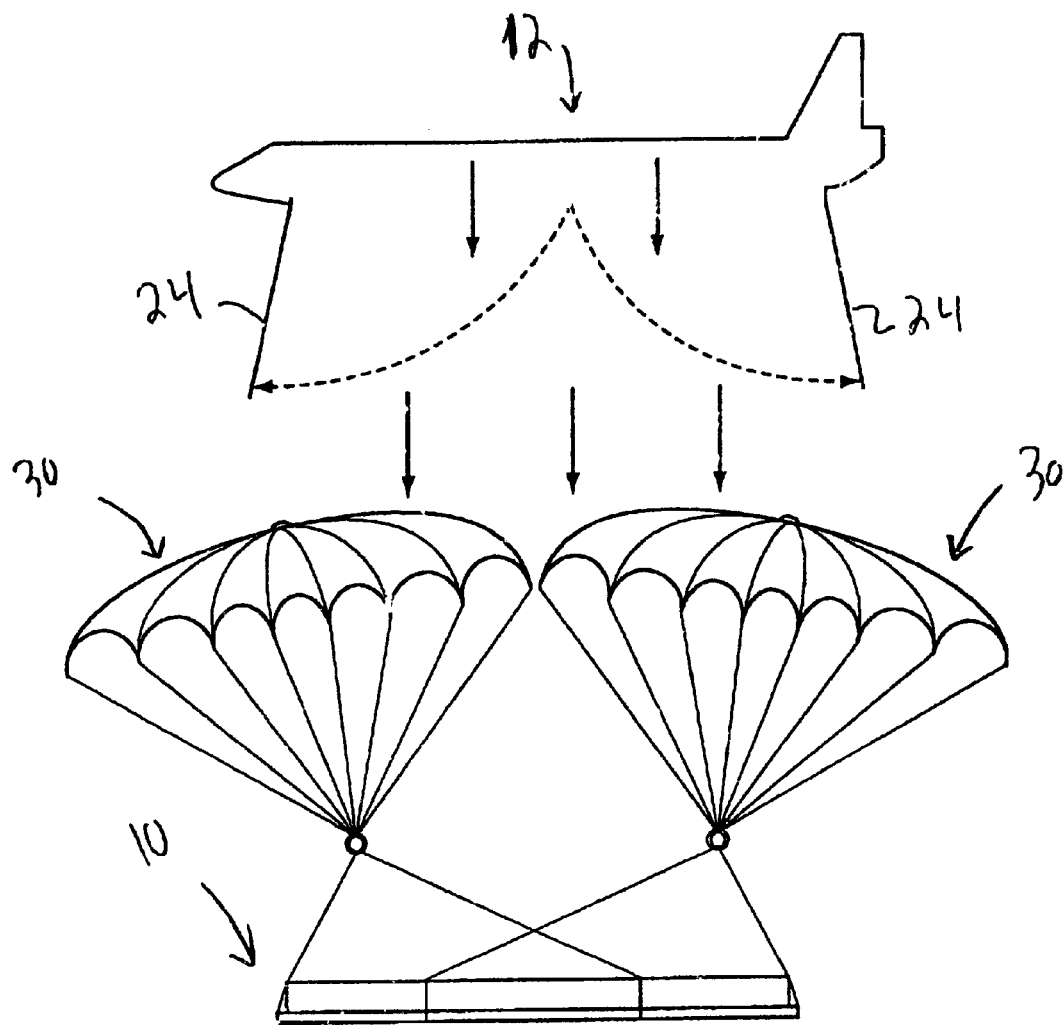
FIG. 5 is a side view, illustrating the deployment of an evacuation cabin through a bottom portion of an airplane cabin.
Figure 6:
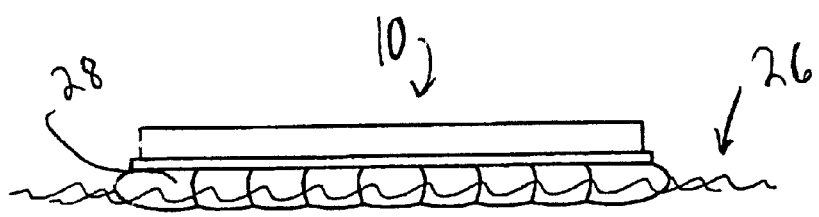
FIG. 6 is a side view, illustrating the use of a flotation device located on the evacuation cabin.

Referring first to FIGS. 1–3 and 5–6, reference number 10 refers generally to an embodiment of an evacuation cabin of the present invention. As illustrated in FIGS. 1, 2 and 5, the evacuation cabin 10 is mounted in a lower portion of an airplane 12. The airplane 12 can be anything from a small plane capable of carrying only one or two passengers to a jet-type passenger plane (as shown in FIGS. 1–2 and 5) capable of transporting hundreds. Also, it should be noted that a particular airplane 12 may be equipped with a single evacuation cabin 10, or with two or more evacuation cabins 10.

Figure 3:
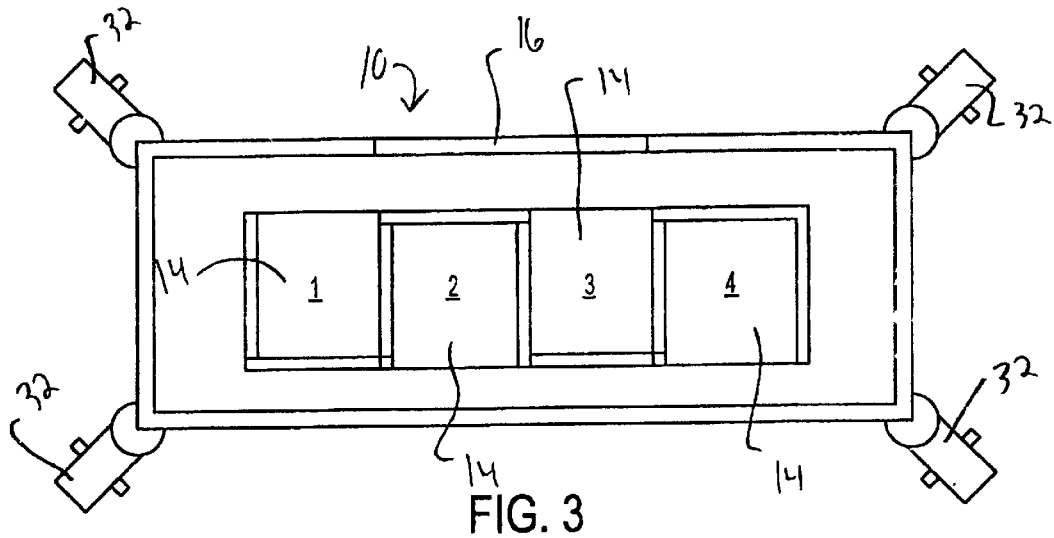
FIG. 3 is a top, cut-away view of an embodiment of the evacuation cabin of the present invention.

Attention is now directed to FIG. 3. The interior of the evacuation cabin 10 includes at least one and preferably a plurality of seats 14 for passengers. The numbers "1" to "4" are intended to each represent a single seat 14. The evacuation cabin 10 is entered through a passageway 16, which passageway 16 can be positioned along a side or end portion of the evacuation cabin 10. Alternatively, the passageway 16 can be positioned at an upper portion of the evacuation cabin 10, like the hatch on a submarine.

Positioned within the evacuation cabin 10 are those things that may be needed in the event of a potential or actual deployment. These include an oxygen supply and associated masks, a radio, a beacon, a global positioning system, safety harnesses for the passengers, a first aid kit, and food and water.

Figure 4:
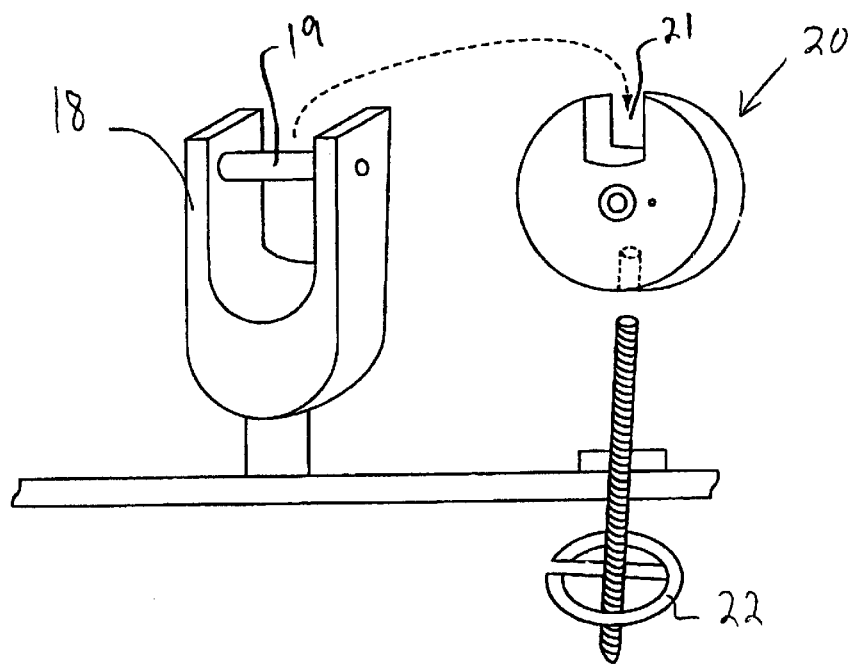
FIG. 4 is a side view of a coupling apparatus useable to detachably couple the evacuation cabin to an interior portion of an airplane.

Referring now to each of FIGS. 3 and 4, the evacuation cabin 10 is preferably suspended by one or more hooks 18, located on an interior portion of the airplane 12 and projecting toward the sides of the evacuation cabin 10. The hooks 18 have a substantially U-shape, with a cross-bar 19 extending there across. Corresponding mating devices 20 are positioned on an outside surface of the sides of the evacuation cabin 10, and are dimensioned to couple to the hooks 18, with an opening 21 being dimensioned to receive therein cross-bar 19. De-coupling of the mating devices 20 from the hooks 18 is caused when the opening 21 is retracted from the cross-bar 19. This retraction may be caused by turning of a wheel 22 or electrical activation of such de-coupling, and permits the evacuation cabin 10 to be deployed from the airplane 12. For obvious reasons, it is preferred that the de-coupling be activatable from inside the evacuation cabin 10.

It should be understood that other coupling means—other than hooks 18 and mating devices 20 as herein described—could also be provided to permit ready coupling and de-coupling of the evacuation cabin 10 to the interior of the airplane 12.

The evacuation cabin 10 is preferably guided by four upright guide rails 32, which are positioned at the corners of the evacuation cabin 10. The upright guide rails 32 permit the controlled downward movement of the evacuation cabin 10—following detachment from the hooks 18.

In addition to de-coupling of the evacuation cabin 10, it will also be necessary to open the bottom portion of the airplane 12 to permit the dropping of the evacuation cabin 10 therethrough. In this regard, one or more trap doors 24 will be opened, to permit deployment. The trap doors 24 may be openable from the cockpit and from the interior of the evacuation cabin 10.

In the event that the evacuation cabin 10 is going to land in a body of water 26, it will be desired to place therearound and thereunder a flotation device 28. Inflation of the flotation device 28 should be activatable from the interior of the evacuation cabin 10, and such inflation can take place immediately following deployment and before the evacuation cabin 10 reaches the water, or prior to deployment. It may also be desired to utilize the flotation device 28 as an impact attenuator, and to use it even in the event of a ground landing so as to soften the impact of the landing.

Referring now to FIG. 5, at least one and preferably two parachutes 30 are coupled to the evacuation cabin 10. For some configurations, it may be desired to provide more than two parachutes 30. These are opened following deployment. Such opening can be made automatic upon release of the evacuation cabin 10 from the airplane 12, can be triggered upon the evacuation cabin 10 achieving a certain altitude (so as to prevent deployment at too high an altitude) or can be activated from within the evacuation cabin 10 at the discretion of the occupants.

While the invention has been particularly shown and described with reference to preferred embodiments thereof, it will be understood by those skilled in the art that the foregoing and other changes in form and details may be made therein without departing from the spirit and scope of the invention.

I claim:

1. An evacuation system for an airplane comprising, in combination:

an airplane having an exterior surface including a bottom exterior surface portion extending from a front end portion of said airplane to a rear end portion of said airplane;

an evacuation cabin positionable within said bottom exterior surface portion of said airplane;

means for detachably coupling said evacuation cabin to said airplane;

a pair of trap doors located at a bottom portion of said airplane, defining said bottom exterior surface portion and openable to release said evacuation cabin therethrough;

at least one passenger seat located in an interior portion of said evacuation cabin;

at least one parachute located at an upper portion of said evacuation cabin; and a passageway to permit entrance to said interior portion of said evacuation cabin.

2. The system of claim 1 wherein said airplane is a jet-type passenger plane.

3. The system of claim 1 comprising at least two said parachutes located at said upper portion of said evacuation cabin.

4. The system of claim 1 further comprising a guide rail located at each corner of said evacuation cabin and wherein said guide rails guide up and down movement of said evacuation cabin.

5. The system of claim 1 wherein said means for detachably coupling said evacuation cabin to said airplane comprises at least one hook positioned on an interior portion of said airplane and a complementary mating device positioned on an exterior surface of said evacuation cabin and wherein de-coupling of said mating device and said hook permits detachment of said evacuation cabin from said airplane.

6. The system of claim 5 wherein said means for detachably coupling said evacuation cabin may be performed from inside said evacuation cabin.

7. The system of claim 1 further comprising a flotation device located at a bottom portion of said evacuation cabin.

8. A method for evacuating passengers from an airplane comprising the steps of:

providing an airplane having an exterior surface including a bottom exterior surf ace portion extending from a front end portion of said airplane to a rear end portion of said airplane;

providing an evacuation cabin positionable within said bottom exterior surface portion of said airplane;

providing means for detachably coupling said evacuation cabin to said airplane;

providing a pair of trap doors located at a bottom portion of said airplane, defining said bottom exterior portion and openable to release said evacuation cabin therethrough;

providing at least one passenger seat located in an interior portion of said evacuation cabin;

providing at least one parachute located at an upper portion of said evacuation cabin;

providing a passageway to permit entrance to said interior portion of said evacuation cabin;

opening said pair of trap doors;

detachably coupling said evacuation cabin from said airplane;

releasing said evacuation cabin through said trap doors; and opening said at least one parachute.

9. The method of claim 8 wherein said airplane is a jet-type passenger plane.

10. The method of claim 8 further comprising the step of providing at least two said parachutes located at said upper portion of said evacuation cabin.

11. The method of claim 8 further comprising the step of providing a guide rail located at each corner of said evacuation cabin and wherein said guide rails guide up and down movement of said evacuation cabin.

12. The method of claim 8 wherein said step of detachably coupling said evacuation cabin to said airplane comprises at least one hook positioned on an interior portion of said airplane and a complementary mating device positioned on an exterior surface of said evacuation cabin and wherein de-coupling of said mating device and said hook permits detachment of said evacuation cabin from said airplane.

13. The method of claim 12 wherein said step of detachably coupling said evacuation cabin may be performed from inside said evacuation cabin.

14. The method of claim 8 further comprising the step of providing a flotation device located at a bottom portion of said evacuation cabin.

* * * * *